May 2, 1939.    C. R. ALDEN    2,156,933
METERING PUMP
Filed Feb. 5, 1937    5 Sheets-Sheet 1
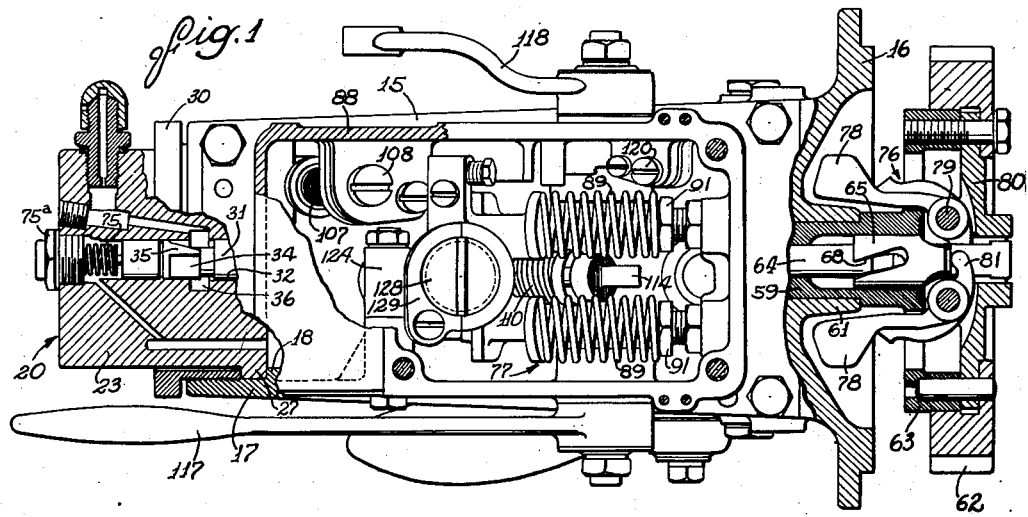
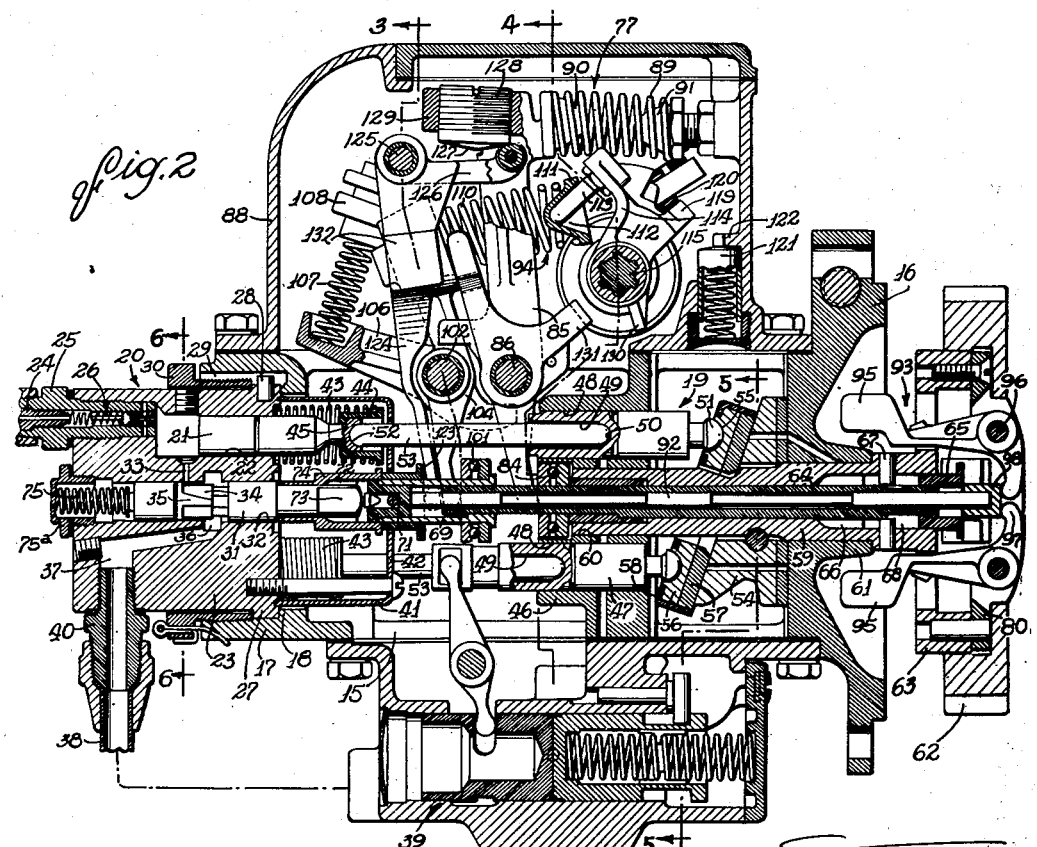

May 2, 1939.  C. R. ALDEN  2,156,933
METERING PUMP
Filed Feb. 5, 1937   5 Sheets-Sheet 2
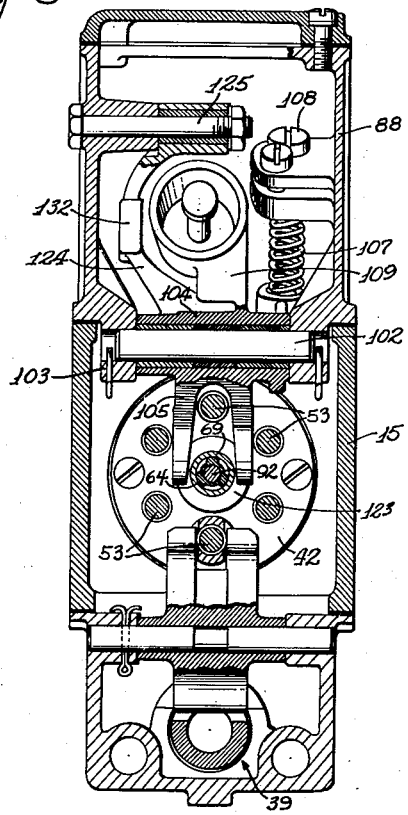
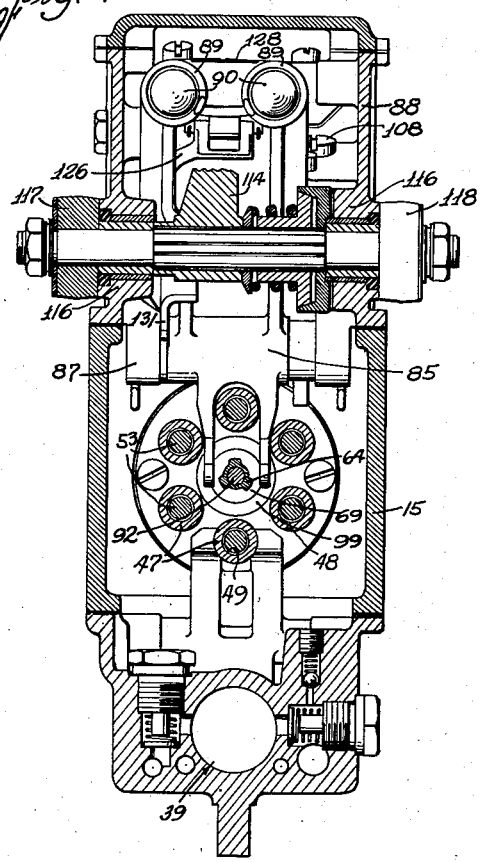
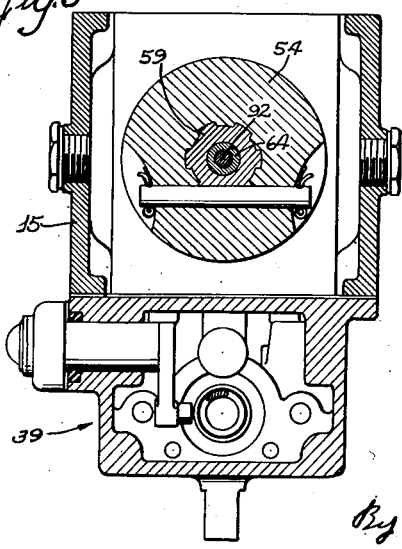
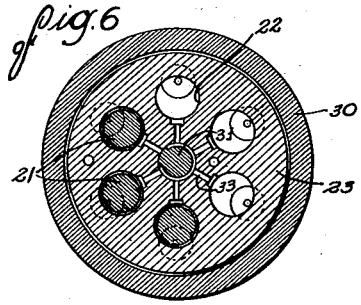
INVENTOR
Carroll R. Alden
By Parker, Carlson, Pitzner & Hubbard
ATTORNEYS

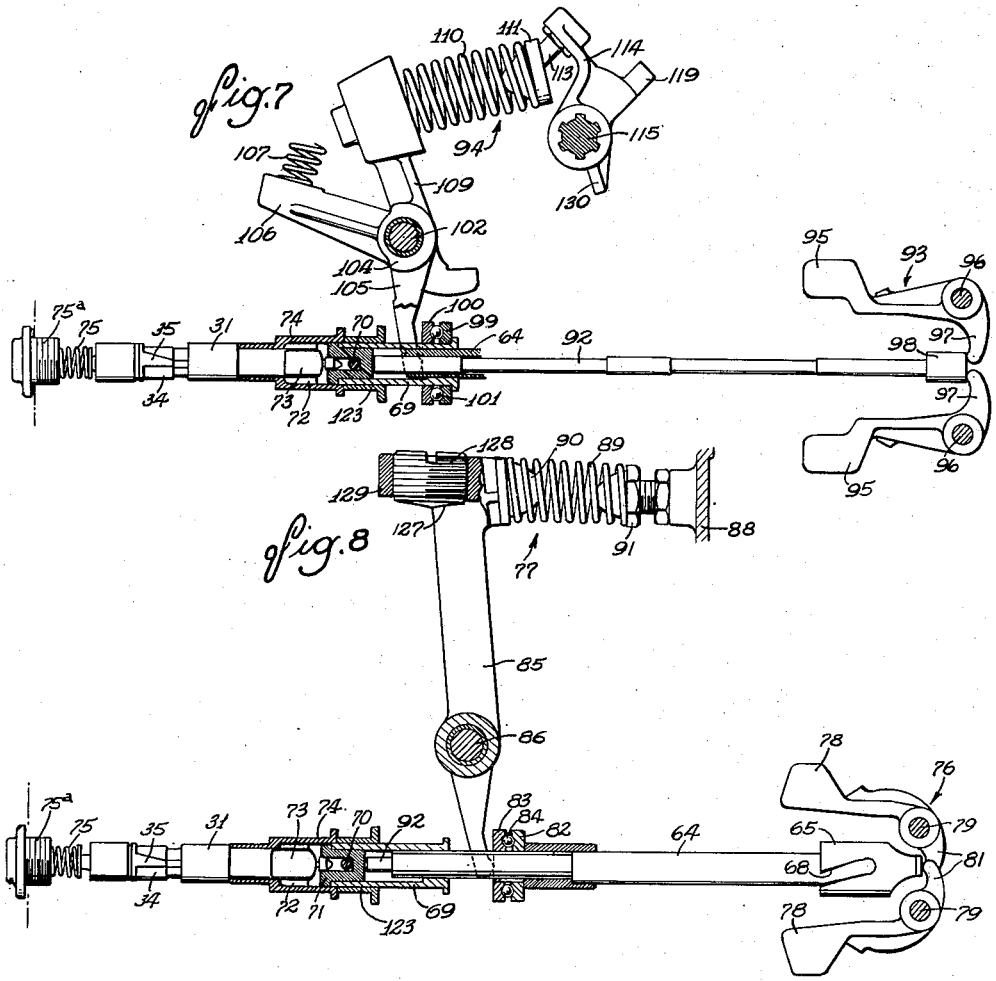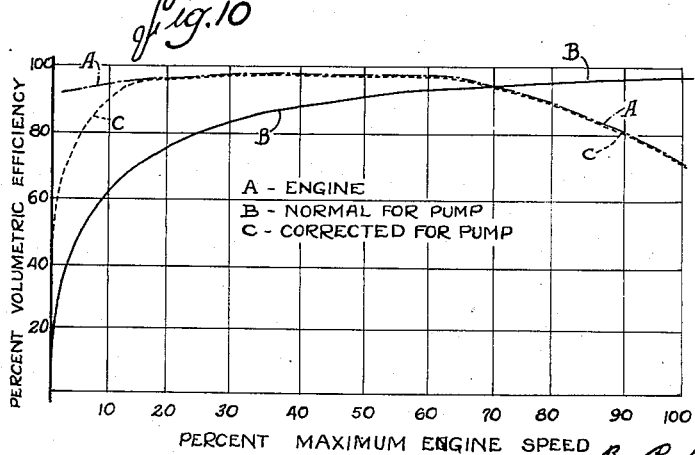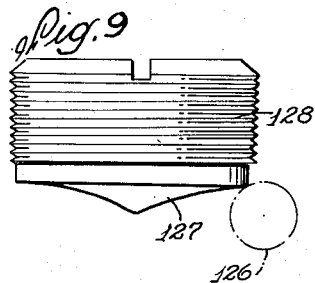

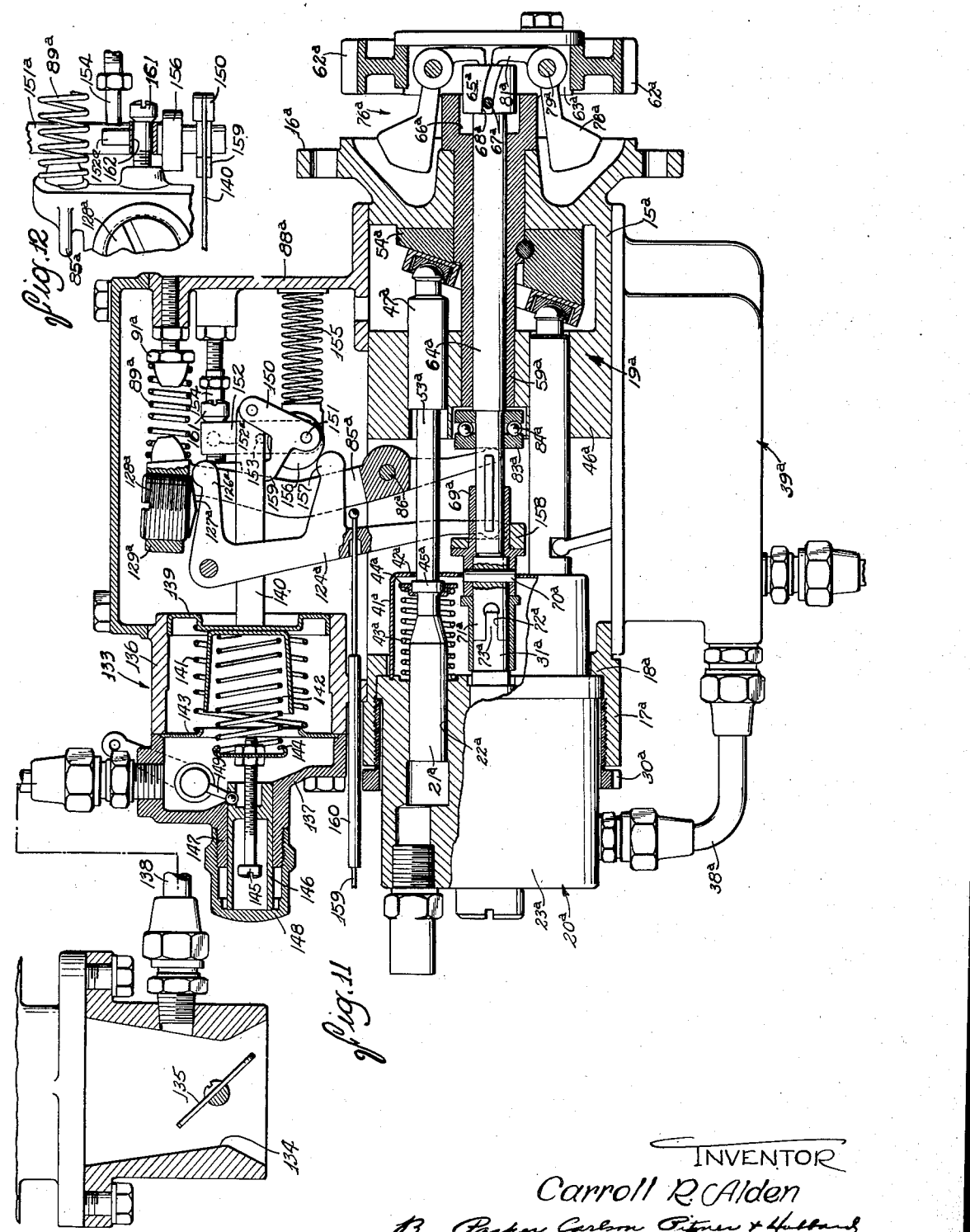

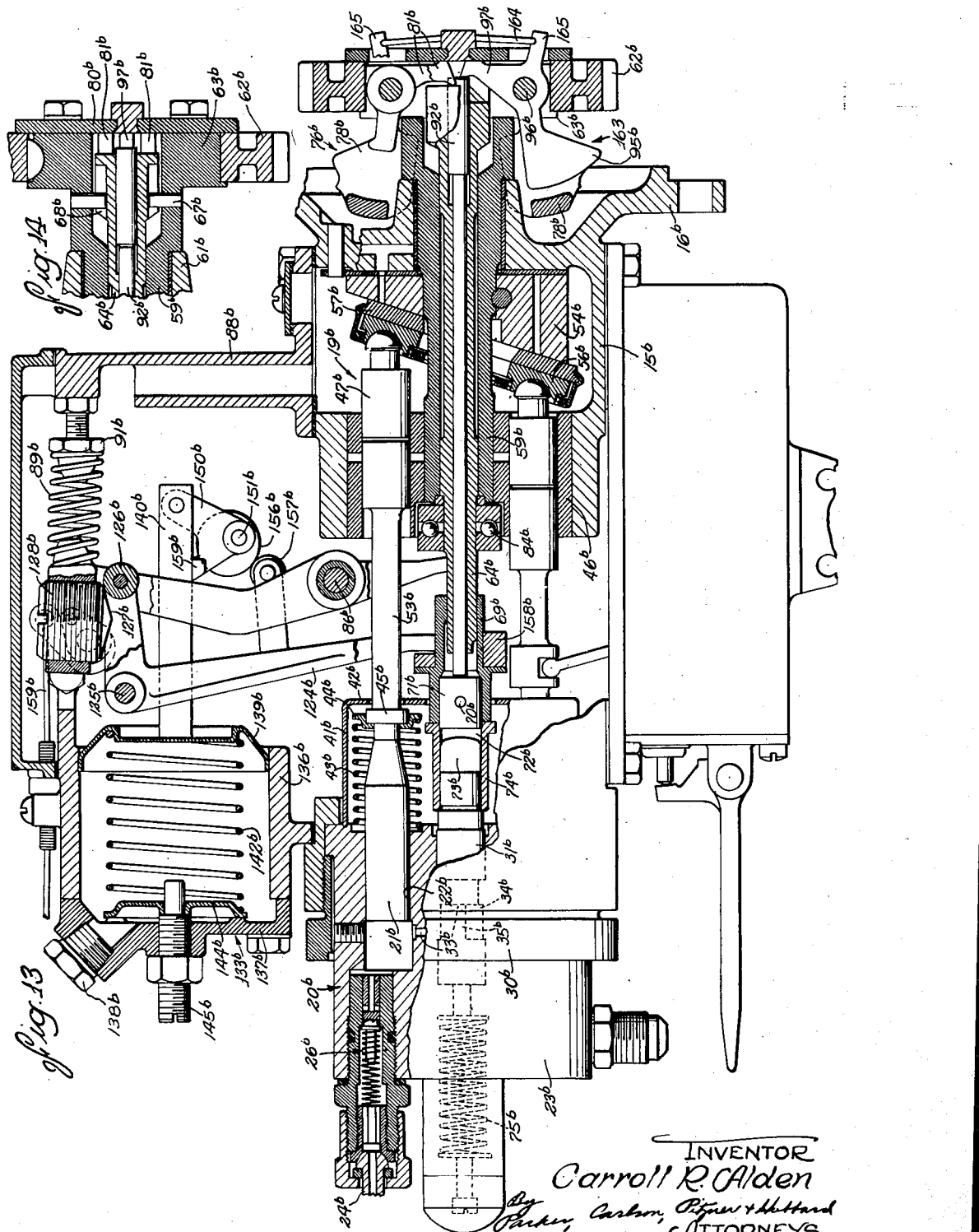

Patented May 2, 1939

2,156,933

UNITED STATES PATENT OFFICE 2,156,933

METERING PUMP

Carroll R. Alden, Detroit, Mich., assignor to Ex-Cell-O Corporation, a corporation of Michigan Application February 5, 1937, Serial No. 124,220

26 Claims. (Cl. 123—140)

The present invention relates to improvements in metering pumps, and particularly pumps for injecting fuel into internal combustion engines.

One of the objects of the present invention is to provide a metering pump having novel means for automatically controlling the quantity of fuel injection for any predetermined selective engine speed over the speed range.

Another object is to provide a metering pump having new and improved means for automatically controlling the starting point of injection relative to the engine piston position in response to various selective engine operating speeds.

A further object resides in the provision of novel means for automatically limiting the maximum quantity of fuel that can be injected during any one pump cycle at any operative engine speed so that the ratio of available air to fuel cannot fall below a predetermined adjustable minimum necessary for efficient combustion.

A more specific object resides in the provision, in a metering pump having a control valve, of a novel speed control governor which is operable to adjust the valve to maintain a predetermined engine speed, and which is adjustable at will to maintain different selective speeds; also a timing control governor which is operable to adjust the valve to vary the timing of injection, for example, the starting point, in accordance with changes in engine speed, and which is adjustable at will to obtain different timing characteristics; also maximum quantity control means responsive to the engine speed for limiting the adjustment of the valve by the speed control governor to limit the maximum quantity of injection in accordance with the volumetric efficiency of the engine.

Still another object is to provide control means of the foregoing character which is relatively compact, simple and inexpensive in construction, and which is sensitive and reliable in operation.

A further object resides in a modified form in which the speed control governor is of the pneumatic type operable in response to the air-intake pressure of the engine.

Still another object resides in a second modified form in which the engine speed over the idling or low-speed range is under the control of a pneumatic governor, and over the high-speed range is under the control of a centrifugal governor.

A further object resides in the provision of novel means automatically operable to compensate for differences in pump leakage at different speeds.

Other objects and advantages will become apparent as the description proceeds.

In the accompanying drawings, Figure 1 is a view partially in plan and partially in longitudinal section of a pump embodying the features of my invention.

Fig. 2 is a longitudinal generally vertical sectional view of the pump.

Fig. 3 is a transverse generally vertical sectional view taken substantially along line 3—3 of Fig. 2.

Fig. 4 is a transverse generally vertical sectional view taken substantially along line 4—4 of Fig. 2.

Fig. 5 is a partial generally vertical sectional view taken along line 5—5 of Fig. 2.

Fig. 6 is a transverse sectional view taken along line 6—6 of Fig. 2.

Fig. 7 is a fragmentary detail view illustrating the speed control governor.

Fig. 8 is a fragmentary detail view of the timing control governor.

Fig. 9 is an enlarged detail view of a cam for controlling the maximum quantity of fuel injection at different speeds.

Fig. 10 is a diagrammatic representation comparing the volumetric efficiency of the engine and the pump delivery per stroke at various operating speeds.

Fig. 11 is a view generally similar to Fig. 2, but of a modified form of the invention in which the speed control governor is of the pneumatic type operable in response to manifold pressure.

Fig. 12 is a fragmentary plan view of a detail of the construction illustrated in Fig. 11.

Fig. 13 is a view similar to Fig. 11, but of another modified form of the invention in which the quantity of fuel injection over different ranges of engine speed is controlled respectively by a pneumatic governor and a centrifugal governor.

Fig. 14 is a fragmentary sectional view of the centrifugal governors embodied in the form of Fig. 13.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention is illustrated in Figs. 1 to 9 as embodied in a timed metering and distributing pump having means for automatically controlling the speed-delivery characteristics. In its broad aspects, the invention, however, is not limited to the particular type of pump shown, but may be adapted to various types of timed metering pumps.

The pump, constituting the exemplary embodiment of the invention, comprises a main housing or body 15, one end of which is closed by a mounting plate 16 adapted to be secured to any desired part of the block of an internal combustion engine (not shown), and the other end of which is provided with an open sleeve 17 having an internal annular flange defining an outwardly facing shoulder 18. A pump drive unit 19 is located in the closed end of the housing 15, and a self-contained hydraulic unit 20, including the closely fitting precision parts for metering and delivering the fuel, is removably inserted into the sleeve 17 in position against the shoulder 18 for operative association with the drive unit.

To facilitate a ready understanding of the invention, the detailed construction of the hydraulic and drive units 19 and 20 will first be described.

The self-contained hydraulic unit 20 (see Figs. 2 and 6) comprises a plurality of parallel annularly arranged reciprocatory pump plungers 21, six in the present instance, which extend slidably into a like number of cylinders 22 formed in and opening to the inner end of a stationary body 23. Individual discharge lines or tubes 24 (one shown), for delivering the metered charges of fuel to the engine, are connected respectively to the closed ends of the pump cylinders 22 by means of valve fittings 25 threaded into the end of the body 23. A spring-seated check valve 26 is provided in each of the fittings 25 to prevent a reverse flow from the associated discharge line to the corresponding cylinder, and to close against the low pressure of the fuel supply. Preferably, the body 23 is cylindrical, and is provided at its inner end with an external peripheral flange 27 having a sliding fit in the sleeve 17 and adapted to engage the shoulder 18 to align the hydraulic unit 20 with the drive unit 19. A spline pin 28, projecting radially from the body 23 into a straight longitudinal groove 29 in the sleeve 17, serves to locate the hydraulic unit 20 in the proper angular position. A ring nut 30 is freely rotatable on the body 20 against the flange 27, and is removably threaded into the sleeve 17 to clamp the hydraulic unit 20 in position.

The metering and timing of fuel injection is under the control of a single rotary valve member 31 which is mounted for rotation and axial adjustment in a valve bore 32 opening through the body 23 centrally of the cylinders 22. A plurality of inlet and by-pass ports 33 open in a common transverse plane from the periphery of the valve bore 32 respectively to the closed ends of the cylinders 22, and are never closed or sealed by the plungers 21. The valve rotor 31 is formed intermediate its ends with a peripheral low pressure fuel supply and relief belt 34 which in the plane of the ports 33 is interrupted only by a longitudinally extending land 35 in bearing engagement with the bore 32. An annular groove 36, formed in the bore 32, is always in communication with the belt 34, and is connected through a fuel inlet passage 37 to a line or tube 38 leading from a suitable source of fuel supply, such, for example, as a primary pump 39 mounted on the underside of the housing 15. The supply line 38 is connected by means of a screw fitting 40 removably threaded into one side of the body 23.

It will be understood that the pump plungers 21 are reciprocated in overlapping uniform sequence, and that the valve member 31 is rotated in timed relation thereto. The valve member 31 is so timed that the land 35 in its successive movement across the ports 33 will close each port during a predetermined portion of the pressure stroke of the associated pump plunger 21. The trapped fuel displaced by the plunger is delivered to the associated discharge line 24 for injection into the engine. During the remainder of the pressure stroke, before and after injection, the fuel displaced by the plunger 21 is returned through the associated port 33 to the belt 34, and during the suction or return stroke fuel is supplied to the associated cylinder 22.

The width of the land 35 in the plane of the ports 33 determines the quantity of metered injection. To provide for quantity adjustment, the land 35 is tapered longitudinally, and preferably is triangular in shape. Depending on the direction of the controlling side edges of the land 35, either the starting point of injection, or the end point thereof, or both, may be variable upon axial adjustment of the valve members 31 for quantity control.

The pump plungers 21 and the valve member 31 project into a cup-shaped enclosing shell 41 and are aligned with openings in the transverse wall 42 thereof. The rim of the shell 41 is suitably bolted against the inner end of the body 23. Coiled compression springs 43 encircle the projecting ends of the plungers 21 and constitute the means for urging the plungers outwardly of the cylinders 22 in the suction stroke. The springs 43 abut at one end against the cylinder body 23, and at the other end respectively against cup-shaped retainer members 44 anchored to abutment heads 45 on the outer ends of the plungers 21.

The hydraulic unit 20, is brought, as an incident to its insertion into the housing 15, into separable association with the drive unit 19, and the latter is operable to reciprocate the plungers 21 and rotate the valve member 31 in proper synchronism, as described. Referring now to the detailed construction of the drive unit 19, the housing 15 is formed intermediate its ends and in spaced relation to the mounting plate 16 and the hydraulic unit 20 with a transverse wall centrally enlarged to constitute a tappet body 46. A plurality of tappets 47 are reciprocably mounted in bores 48 opening through the body 46, and are in axial alignment respectively with the pump plungers 21. Each tappet 47 is formed in one end with an axial bore 49 terminating with a socket 50, and on the other end with a ball head 51. Similar sockets 52 in opposed relation to the sockets 50 and accessible through the openings in the wall 42 of the shell 41 are formed in the abutment heads 45 on the projecting ends of the pump plungers 21. A plurality of actuating rods 53, with the opposed ends rounded and in engagement respectively with the sockets 50 and 52, are operatively interposed between the pump plungers 21 and the respective tappets 47, so that in normal operation each plunger, associated connecting rod and associated tappet reciprocate jointly.

The tappets 47 are reciprocable in uniformly timed relation by a rotary swash plate 54. More particularly, the ball heads 51 of the tappets 47 are in bearing engagement with sockets 55 formed in a plurality of floating shoes 56 confined on an annular shoe plate 57 by an annular cage or retainer 58. The plate 57 and shoe 56 assembly is slidably disposed against the inclined face of the swash plate 54.

The swash plate 54 is rotatably disposed against the mounting plate 16, and is rigidly secured to a tubular drive shaft 59. The inner end of the shaft 59 is journaled in a bore 60 opening centrally through the tappet body 46, and the outer end is journaled in and extends through a bearing 61 in the mounting plate 16. A gear 62 is removably secured to a hub 63 on the outer end of the shaft 59, and is adapted to be connected for a drive from the engine crank shaft (not shown). Hence, the pump plungers 21 will be operated in predetermined phase relation to the engine pistons (not shown).

The valve member 31 is rotatable from the shaft 59 in adjustable timed relation to the reciprocation of the pump plungers 21. The drive to the valve member 31 (see Figs. 2 and 8) includes an inner tubular shaft 64 which extends through the shaft 59, and which is rigid at its outer end with a coupling sleeve 65 slidable and rotatable in an end enlargement 66 of the bore through the shaft 59. Two diametrically opposed spline pins 67 project radially from the shaft 59 into inclined or helical slots 68 in opposite sides of the sleeve 65. A second coupling sleeve 69 is splined onto the inner end of the inner shaft 64 for rotation therewith and straight-line axial adjustment relative thereto. Fitting into and rigidly connected to one end of the coupling sleeve 69, as by a cross pin 70, is a member 71 having an axially separable rotative drive connection with the valve rotor 31. In the present instance, the member 71 has an end slot 72 slidably receiving a tang 73 on the adjacent end of the valve rotor 31. A sleeve 74 fixed on the same end of the rotor 31 has a telescoping fit with the slotted member 71 and the coupling sleeve 69. A coiled compression spring 75 is seated at one end against a hollow screw plug 75ª threaded into and closing the outer end of the valve bore 32, and engages at the other end against the valve rotor 31 to urge the latter to the right and thereby to maintain the disengageable driving connection between the slotted member 71 and the tang 73.

It will be evident that axial adjustment of the valve rotor 31 selectively to the right or left will result in a corresponding increase or decrease in the quantity of metered injection. The phase relation of the pump plungers 21 and the engine pistons is constant; however, the start of injection may be advanced or retarded respectively by shifting the coupling sleeve 65 and shaft 64 axially in opposite directions to effect a corresponding angular adjustment of the valve rotor 31 relative to the drive shaft 59. These adjustments for volume and timing control are permitted independently of each other by reason of the spline connection between the shaft 64 and the coupling sleeve 69.

One of the features of the present invention is to control the starting point of injection in accordance with the engine speed, for example, to advance the starting point of injection relative to the position of the engine piston upon an increase in engine speed. In the form of Figs. 1 to 9, the axial position of the shaft 64, and hence its position of rotary adjustment, is subject to adjustment automatically by a timing control governor 76 responsive to the engine speed. More particularly, the governor 76 (see Fig. 8) is of the centrifugal type, and comprises two oppositely swinging fly ball weights 78 which are pivotally mounted on fixed pins 79 in an end plate 80 bolted to the driving hub 63, and which act in opposition to an adjustable spring mechanism 77. Radially extending heels 81 on the weights 78 bear against the outer end of the coupling sleeve 65, and tend to urge the latter axially in a direction to advance the starting point of injection progressively in response to corresponding increases in speed.

An annular bearing raceway 82 is fixed on the shaft 64 for movement therewith, and is disposed adjacent the inner end of the drive shaft 59. Slidably and rotatably disposed on the shaft 64 in opposed relation to the raceway 82 is a second raceway 83. Suitable anti-friction rollers 84 are located between the raceways 82 and 83 to complete the bearing relationship. A timing lever 85 is pivoted intermediate its ends on a cross pin 86 suitably supported in depending lugs 87 on a governor housing 88 bolted to the top of the housing 15, and has a depending bifurcated end in engagement with the exposed face of the bearing raceway 83 at opposite sides of the shaft 64. The other end of the lever 85 projects upwardly into the governor housing 88, and is acted on by spring means 89 tending to urge the sleeve 65 in a direction to retard the starting point of injection. In the present instance, the spring means 89 consists of two parallel coiled compression springs seating at one end against two centering projections 90 on the upper end of the lever 85, and at the other end against two opposed centering projections 91 adjustably threaded into the adjacent wall of the housing 88. It will be evident that the spring mechanism 77 will seek a state of equilibrium with the governor weights 78 at all operating speeds, and hence the phase relation of injection to engine piston position will vary as determined by the spring means 89 in response to speed changes. Different speed-phase characteristics may be obtained by adjusting the compression of the spring means 89, as by means of the adjustable projections 91.

Another feature of the invention resides in controlling the quantity of fuel injection to limit the engine operating speed to any selectively determinable value within a suitable range. In the form of Figs. 1 to 9, the axial position of the valve rotor 31 is adapted to be adjusted by an elongated quantity control pin 92 which extends slidably and rotatably through the shaft 64, and the inner end of which constitutes an abutment for the slotted member 71 to limit movement of the valve rotor by the spring 75. The axial position of the pin 92 is subject to adjustment (see Fig. 7) by a speed control governor 93 preferably comprising two fly ball weights 95 acting in opposition to a manually adjustable spring mechanism 94. More particularly, the fly ball weights 95 are pivotally mounted on fixed pins 96 in the end plate 80, and are adapted to swing outwardly in a plane at right angles to that of the weights 78. Radially extending heels 97 on the weights 95 bear against a head 98 on the outer end of the pin 92. The transverse wall of the hub 63 and the plate 80 are slotted and the mounting plate 16 is recessed to permit free swinging movement of the weights 78 and 95. Upon an increase in engine speed, the weights 95 will move the pin 92 inwardly against the spring mechanism 94 to reduce the quantity of fuel injection.

The spring mechanism 94 opposing the governor 93 comprises a raceway 99 fixed for rotation and axial movement with the coupling sleeve 69. A second raceway 100 is rotatably disposed on the sleeve 69 in opposed relation to the raceway 99, and anti-friction rollers 101 are positioned between the raceways to complete the bearing relationship. Pivotally mounted intermediate its ends on a cross pin 102 supported in depending lugs 103 on the housing 88 is a three-armed lever 104. One arm 105 of the lever 104 is bifurcated and extends downwardly into engagement with the exposed face of the raceway 100. A lateral arm 106 is engaged by a coil compression spring 107 which tends to revolve the lever 104 against the raceway 100 for idling speed control, and which is seated at its fixed end against an adjustable stop 108 on the inside of the housing 88. The third arm 109 projects upwardly, and is engaged by a coil compression spring 110 acting in the same direction as the spring 107, and available for variable high speed operation.

It will be understood that the springs 75, 107 and 110 tend jointly to effect movement of the valve rotor 31 in a direction to increase the quantity of fuel injection, and that the governor weights 95 oppose this movement and set up an equilibrium at an engine speed determined by the spring action. The compression of the spring 110 is adjustable, under manual control, to vary selectively the speed at which the engine is to operate, and hence this spring and its adjusting means correspond to a speed throttle control.

The end of the high speed control spring 110 remote from the lever arm 109 seats against a centering retainer 111 having a flared socket 112 in universal bearing engagement with the rounded end of a pin 113. This pin 113 is fixed to one end of a pressure applicator in the form of an arm 114 secured to a cross shaft 115 journaled in and extending through bearings 116 in the side walls of the housing 88. A lever 117 is fixed on one end of the shaft 115 for hand actuation, and a crank arm 118 is secured to the other end of the shaft for connection to a foot pedal (not shown). Fixed on the arm 114 is a lug 119 which is movably disposed between two limit stops 120 and 121. The stop 120 is adjustably mounted in the housing 88, and defines the maximum speed position. The stop 121 defines the inoperative position of the arm 114, and is yieldable, preferably consisting of a spring-actuated plunger normally projected against a fixed lug 122. When the arm 114 is oscillated into position against the stop 121, the compression of the spring 110 is relieved, and the idling spring 107, supplemented by the light pressure of the rotor spring 75, assumes primary control of the speed of operation.

The volumetric efficiency of an internal combustion engine varies with speed changes. Referring to Fig. 10, the typical curve A, which represents the volumetric efficiency, shows that less air per cycle is handled at top engine speeds than at lower speeds. The normal fuel delivery of the pump per cycle tends to increase in accordance with the speed as illustrated by the typical curve B. This is due to the increased effect of leakage at low speeds, and to increased effective duration of by-pass port closure at high speeds. As a result, there is likely to be an insufficiency of fuel to develop maximum torque at the lower speeds, as represented by the space between the curves A and B below 70 per cent. of the maximum engine speed, and an excess of fuel at the higher speeds, as represented by the space between the curves A and B above 70 per cent. of the maximum engine speed. One of the important features of the present invention resides in correcting the fuel delivery, as represented by the curve C, to conform more nearly to the theoretical volumetric efficiency of the engine. To this end, means is provided for automatically limiting the maximum quantity of fuel in accordance with the varying maximum requirements at different operating speeds, regardless of the quantity of fuel that might otherwise be delivered under the existing state of equilibrium between the spring mechanism 94 and the weights 95, to insure that the ratio of available air to the fuel delivered cannot drop below an adjustable minimum previously determined as desirable for safe and efficient operation.

This limitation is a function of the engine speed, and hence is advantageously subjected to control by the governor 76 acting through the timing lever 85. In Figs. 1 to 9, an abutment or stop collar 123 is freely rotatable and slidable on the coupling sleeve 69 for end engagement with the sleeve 74 on the valve rotor 31. A bell crank lever 124, pivotally mounted on a pin 125 supported within the housing 88, has a depending bifurcated arm adapted to engage the right end of the collar 123. The other arm of the lever 124 carries a cam follower 126 adapted for engagement with a cam 127 on the timing lever 85. In the present instance, the cam 127 (see Fig. 9) is formed on the end of a screw plug 128 removably and adjustably threaded through a lug 129 on the upper end of the lever 85, and is suitably contoured in accordance with the desired characteristics of the curve C so that the fuel limitation will be properly responsive to changes in engine speed. The characteristics of the curve C may be changed at will as desired merely by substituting cams 127 of different contours. The stop collar 123, reacting through the lever 124 on the cam 127, serves as a limit stop for the sleeve 74, and hence limits adjustment of the valve rotor 31 under the influence of the spring 75 in a direction to increase the quantity of fuel injection. Within this limit, normal speed control by the spring 110 prevails. When the limit is reached, additional movement of the coupling sleeve 69 to the right is permitted by movement of the tang 73 out of its extreme inward position within the slot 72.

When the restraining force, adapted to be applied through the hand lever 117 or the pedal actuated arm 118, on the speed adjusting arm 114 is released, the lug 119 will engage but not depress the yieldable stop 121, thereby instituting idling operation. To provide means for stopping injection, the arm 114 is formed with a finger 130 which is adapted upon movement against the pressure of the stop 121 to engage one arm of a bell crank lever 131 freely pivotal on the pin 86. The other arm of the lever 131 is disposed for engagement with a lug 132 on the lever 124, and upon oscillation by the arm 114 will actuate the lever 124, independently of the cam 127, to shift the stop collar 123 and thereby the rotor 31 into the stop position.

In the modified form of Figs. 11 and 12, the quantity of fuel injection is under the control of a pneumatic governor 133 in balance with and responsive to changes in the manifold pressure of the engine. Air enters the manifold (not shown) through an inlet duct 134 in which is mounted an adjustable restriction, such as a butterfly valve 135 operable manually in any appropriate manner, as by a foot accelerator. At any given setting of the valve 135, the manifold pressure is responsive to the engine speed. The governor 133 therefore serves both to vary the quantity of fuel delivered to the engine over a suitable range in accordance with selective adjustments of the valve 135 responsive to manifold vacuum as determined by the opening of the valve 135 at any given speed. In other material respects, such as the pump per se, the spring-loaded timing governor and the means for limiting the maximum quantity of fuel injection in accordance with the volumetric efficiency-speed characteristics of the engine, the modified form is closely similar in construction and operation to the first form. Hence, parts of the modified form are identified without further description by the same reference numerals as the corresponding parts of the first form plus the distinguishing character a.

The pneumatic governor 133 of Fig. 11 comprises a cylinder 136 which is removably secured in and opens through one side wall of the governor housing 88ª, and which is closed at the outer end by a cylinder head 137. A suitable passage or tube 138 serves to connect the interior of the cylinder head 137 to the manifold inlet duct 134 at the low pressure side of the valve 135. A fluid pressure responsive element, such as a piston 139 is slidably disposed in the cylinder 136, and is rigid with an axial rod or bar 140 extending into the housing 88ª. Two concentrically disposed coiled compression springs 141 and 142 tend to move the piston 139 outwardly of the cylinder 136 against the manifold suction. The fixed end of the spring 141 engages an annular seat 143 secured between the cylinder 136 and the head 137. The corresponding end of the spring 142 extends through the seat 143, and engages an adjustably mounted seat 144 within the head 137. In the present instance, the spring seat 144 is supported on the inner end of a bolt 145 adjustably mounted in a tubular plunger 146 slidable in a guide sleeve 147 in the end wall of the head 137. The sleeve 147 extends axially of the piston 139, and is closed at the outer end by a cap screw 148 against which the plunger 146 normally abuts. It will be understood that the aggregate pressure of the springs 141 and 142 determines the characteristics of the governor 133, and therethrough the desired air-fuel ratio of the combustible mixture. Upon removal of the nut 148, the bolt 145 may be turned to adjust the pressure of the spring 142 and thereby vary the ratio. A crank arm 149 engages the plunger 146, and is operable from the exterior of the head 137 to move the plunger inwardly from the cap 148 when priming is desired.

The inner end of the piston rod 140 is pivotally connected to the free end of an arm 150 (see Fig. 12) fixed on a pin 151. This pin is rotatably mounted in the lower end of a lever 152 which is supported intermediate its ends on a fixed pivot 153 within the housing 88ª, and which is adapted by means of an extension 152ª to engage at its upper end against an adjustable screw stop 154. A coiled compression spring 155 acts against the lower end of the lever 152 to oscillate and hold the latter normally against the stop 154. Secured to the pin 151 for rotary adjustment by the arm 150 is a cam or eccentric 156 which engages a cam follower 157 on the depending arm of the bell-crank lever 124ª. The lower end of this lever arm engages a thrust bearing 158 on the coupling sleeve 69ª, and therethrough constitutes an adjustable stop determining the axial position of the valve member 31ª.

It will be understood that upon movement of the piston 139 to the left in response to an increase in manifold suction, the cam 156 will be adjusted to oscillate the lever 124ª in a direction to reduce the quantity of fuel injection. Upon a reverse movement of the piston 139, the quantity of fuel injection will be increased. Outward movement of the piston 139 is limited by a stop projection 159 on the arm 150 adapted in one extreme position to engage the underside of the rod 140 and thereby lock the parts against further relative movement. The lever 124ª is also under the control of the cam 127ª, and, if the quantity of fuel injection reaches a predetermined maximum for the prevailing speed, will limit further adjustment of the valve rotor 31ª. In this event, the cam 156 may separate from the follower 157. If the limit of injection for the prevailing speed has not been reached, the follower 126ª may be separated from the cam 127ª. Injection may be stopped manually by a pull wire 159 extending through a conduit 160 into the housing 88ª and connected to the lever 124ª.

Provision is made for axially adjusting the valve member 31ª independently of the governor 133 and in response to certain changes in the engine speed to compensate for the leakage of fuel at the lower speeds and thereby maintain a readily ignitable air-fuel ratio. As a result, the low speed end of the curve C (see Fig. 10) is brought more nearly into coincidence with the corresponding end of the curve A. The means for this purpose comprises a headed member 161 which is adjustably threaded into the timing lever 85ª, and which extends freely through an opening 162 in the upper end of the lever 152. The head of the member 161 is larger than the opening 162, and hence is adapted to oscillate the lever 152 about the pivot 153 in response to movement of the lever 85ª in the slow speed range. The cam 156 will thereby be oscillated correspondingly, and independently of adjustment by the governor 133 to augment the quantity of injection.

The modified form of Figs. 13 and 14 is closely similar to the two preceding forms in respect to the construction and operation of the pump per se, the timing control, and the maximum fuel quantity control, and is closely similar to the form of Figs. 11 and 12 in respect to the control of the speed in response to the manifold pressure. It is therefore deemed necessary to describe in detail only the essential differences. Parts of the third form are identified by the same reference numerals as corresponding parts in the first two forms plus the letter b.

The third form comprises a pneumatic governor 133ᵇ for controlling the speed in response to the manifold pressure. Governors of this type are particularly advantageous in maintaining close speed regulation at low engine idling speeds. At high speeds, closer regulation is obtainable by centrifugal governors. The third form therefore also comprises a centrifugal governor 163 which assumes control at and near maximum speeds.

Referring more particularly to Figs. 13 and 14, the cylinder 136ᵇ of the pneumatic governor 133ᵇ is integral with the housing 88ᵇ, and the cylinder head 137ᵇ is in the form of a plate in which the anchor bolt 145ᵇ for the spring seat 144ᵇ is adjustably threaded. The piston 139ᵇ is actuated by the single spring 142ᵇ. In this form, the pin 151ᵇ supporting the cam 156ᵇ is shown mounted in a fixed position. Manually operable means 159b is provided for depressing the upper arm of the lever 124b to stop injection.

The governor 163 comprises fly ball weights 95b pivotally mounted on pins 96b in the drive shaft hub 63b, and engaging the end of a control pin 92b extending slidably through the shaft 64b and coupling sleeve 69b for engagement with the slotted member 71b. The governor 163 acts in opposition to spring means 164 interposed between two fingers 165 on the weights 95b, and at the higher speeds is also adapted to be opposed by the spring 75b. In this form, the weights 95b are within the hollow timing control weights 78b and in the same axial plane as the latter.

In operation, the quantity of fuel injection is under the control of the governor 133b which acts through the rod 140b, arm 150b, cam 156b, lever 124b, bearing 158b and coupling sleeve 69b against the valve rotor 31b in opposition to the spring 75b. At maximum engine speed, the centrifugal governor 163 assumes control to the exclusion of the governor 133b, and will seek a state of balance with the spring 75b to control the axial position of the valve member 31b. It will be understood that the governor 76b controls the phase relation of the starting point of injection to the engine piston position in accordance with the speed, and that the cam 127b limits the maximum quantity of fuel injection for each speed, in the same manner as do the corresponding parts in the two forms of Figs. 1 to 12.

I claim as my invention:

1. A pump mechanism comprising, in combination, a pump having a rotary metering valve axially adjustable to vary the quantity of pump delivery, a plurality of parallel reciprocatory pump units annularly arranged about said valve, spring means tending to urge said valve in a direction to increase said quantity, and drive means for operating said units in timed sequence and for rotating said valve in predetermined phase relation to said units, a stop element for limiting the position of said valve under the influence of said spring means, means for automatically adjusting said stop element in response to changes in the operating speed of said pump, and means for automatically limiting the maximum permissible adjustment of said valve in said direction independently of said last mentioned means.

2. A pump mechanism comprising, in combination, a pump having a rotary metering valve axially adjustable to vary the quantity of pump delivery, a plurality of parallel reciprocatory pump units annularly arranged about said valve, spring means tending to urge said valve in a direction to increase said quantity, and drive means for operating said units in timed sequence and for rotating said valve in predetermined phase relation to said units, governor means driven by said pump for effecting axial adjustment of said valve, and means defining a limit of adjustment of said valve by said governor means in said direction and being automatically operable to adjust said limit in predetermined response to changes in the operating speed of said pump.

3. A pump mechanism comprising, in combination, a pump having a control element adjustable to vary the quantity of pump delivery, means for automatically adjusting said element in response to changes in the operating speed of said pump, said means being adjustable at will to effect adjustment of said element in relation to said speed, and means operable by said pump for automatically limiting the extent of adjustment of said element for maximum quantity in response to said speed.

4. A pump mechanism comprising, in combination, a pump having a drive element and having control means adjustable to vary the quantity of pump delivery and independently adjustable to vary the phase relation of the time of said delivery to the position of said drive element, means for automatically effecting adjustment of said control means to vary said quantity in response to changes in the operating speed of said pump, means for automatically effecting adjustment of said control means to vary said phase relation in response to changes in said speed, and means acting on said control means independently of said second mentioned means to limit the maximum quantity of pump delivery.

5. A pump mechanism comprising, in combination, a pump having a drive element and having a control element adjustable to vary the quantity of pump delivery and independently adjustable to vary the phase relation of the time of said delivery to the position of said drive element, means for automatically adjusting said control element to vary said quantity in response to changes in the operating speed of said pump, means for automatically adjusting said control element to vary said phase relation in response to changes in said speed, and means adjustable by said last mentioned means for limiting the maximum quantity of pump delivery.

6. A pump mechanism comprising, in combination, a pump having an axially adjustable rotary metering control valve and a plurality of of parallel reciprocatory pump units annularly arranged about said valve, drive means for operating said units in timed sequence and including a drive shaft extending axially of said valve, a longitudinally adjustable valve shaft extending axially through said drive shaft and having a helical spline rotary drive connection with said drive shaft and a straight spline rotary drive connection with said valve, a radial anti-friction abutment on and movable axially with said valve shaft, a phase control lever pivoted intermediate its ends, adjustable spring means acting against one end of said lever and urging the other end of said lever against said abutment to move said valve shaft in one direction, and centrifugal governor weights rotatable with said drive shaft and acting on said valve shaft in opposition to said spring means, whereby the angular phase relation of said valve to said pump units is made responsive to the speed of said drive shaft.

7. A pump mechanism comprising, in combination, a pump having a rotary metering control valve and a plurality of parallel reciprocatory pump units annularly arranged about said valve, drive means for operating said units in timed sequence and including a drive shaft extending axially of said valve, a longitudinally adjustable valve shaft extending axially through said drive shaft and having slidable spline rotary drive connections with said drive shaft and said valve, one of said connections being helical to effect an angular phase adjustment of said valve relative to said drive shaft upon axial movement of said valve shaft, a radial abutment on and movable axially with said valve shaft, a spring actuated phase control lever acting against said abutment to move said valve shaft in one direction, and a centrifugal governor weight rotatable with said drive shaft and acting on said valve shaft in opposition to said lever, whereby the angular phase relation of said valve to said pump units is made responsive to the speed of said drive shaft.

8. A pump mechanism comprising, in combination, a pump having a rotary metering valve and a plurality of pump units controlled by said valve, drive means for operating said units in timed sequence and including a power shaft, means for driving said valve from said shaft and including a slidable helical spline connection for adjusting the angular relation of said valve to said units, adjustable spring means tending to adjust said connection in one direction, centrifugal means rotatable by said shaft and tending to adjust said connection in opposition to said spring means, means for adjusting said valve axially to vary the quantity of delivery at any speed, a cam movable with said spring means, and means controlled by said cam for limiting the adjustment of said valve in a direction to increase said quantity.

9. A pump mechanism comprising, in combination, a pump having a rotary metering valve axially adjustable to vary the quantity of pump delivery, a plurality of parallel reciprocatory pump units annularly arranged about said valve, spring means tending to urge said valve in a direction to increase said quantity, and drive means for operating said units in timed sequence and for rotating said valve in predetermined phase relation to said units, a stop element for limiting the position of said valve under the influence of said spring means, a centrifugal governor for controlling the axial position of said valve in response to the operating speed of said pump, said governor comprising a quantity control lever acting against said stop element in a direction to increase said quantity, idling spring means tending to actuate said lever, operating spring means tending to actuate said lever, means for adjusting the force of said operating spring means, and centrifugal governor weights rotatable by said drive means and acting against said stop element in a direction to decrease said quantity in opposition to said lever, whereby any selective operating speed may be substantially maintained, and means available at will for adjusting said stop element independently of said governor to stop pump delivery.

10. A pump mechanism comprising, in combination, a pump having metering valve adjustable to vary the quantity of pump delivery, a plurality of parallel reciprocatory pump units, spring means tending to adjust said valve in a direction to increase said quantity, and drive means for operating said units in timed sequence and for operating said valve in predetermined phase relation to said units, a stop element for limiting the position of adjustment of said valve under the influence of said spring means, and a centrifugal governor for controlling the position of adjustment of said valve in response to the operating speed of said pump, said governor comprising a quantity control lever acting against said stop element in a direction to increase said quantity, operating spring means tending to actuate said lever, and a centrifugal governor weight rotatable by said drive means and acting against said stop element in a direction to decrease said quantity in opposition to said lever.

11. A pump mechanism comprising, in combination, a pump having a rotary metering valve axially adjustable to vary the quantity of pump delivery, a plurality of parallel reciprocatory pump units annularly arranged about said valve, spring means tending to urge said valve in a direction to increase said quantity, and drive means for operating said units in timed sequence and including a drive shaft extending axially of said valve, a coupling sleeve having an axially separable driving connection with said valve and constituting a stop for limiting adjustment of said valve under the influence of said spring means, a longitudinally adjustable valve shaft extending axially through said drive shaft and having a slidable straight spline rotary drive connection with said coupling sleeve, a slidable helical spline rotary drive connection between said shafts, a quantity control lever acting against said coupling sleeve in a direction to increase said quantity of pump delivery, idling spring means for actuating said lever, operating speed spring means for actuating said lever, means available at will for adjusting the force of said operating speed spring means, a control pin extending slidably through said valve shaft for end abutting engagement with said coupling sleeve, centrifugal governor weights rotatable with said drive shaft and acting on said pin in a direction to decrease said quantity of pump delivery, an abutment on and movable axially with said valve shaft, a timing lever acting against said abutment in a direction to retard the phase relation of said valve shaft to said drive shaft through the action of said rotary spline connection, adjustable spring means tending to actuate said timing lever, centrifugal governor weights rotatable with said drive shaft and acting on said valve shaft in opposition to said timing lever, and means responsive to the movement of said timing lever for limiting the position of said valve against the action of said first mentioned spring means and independently of said quantity control lever.

12. A pump mechanism comprising, in combination, a pump having a metering valve adjustable to vary the quantity of pump delivery, a plurality of parallel reciprocatory pump units, and drive means for operating said units in timed sequence and for operating said valve in predetermined phase relation to said units, a stop element adjustable with said valve, and a centrifugal governor for controlling the position of adjustment of said valve in response to the operating speed of said pump, said governor comprising a quantity control lever acting against said stop element in a direction to increase said quantity, adjustable operating spring means tending to actuate said lever, and centrifugal means rotatable by said drive means and acting against said stop element in a direction to decrease said quantity in opposition to said lever.

13. A pump mechanism comprising, in combination, a pump having a rotary metering valve axially adjustable to vary the quantity of pump delivery, a plurality of parallel reciprocatory pump units annularly arranged about said valve, and drive means for operating said units in timed sequence and including a power shaft extending axially of said valve, a coupling sleeve movable with said valve, a longitudinally adjustable valve shaft extending axially through said power shaft and having slidable spline rotary drive connections with said coupling sleeve and said power shaft, a lever acting against said coupling sleeve in a direction to increase said quantity of pump delivery, spring means for actuating said lever, a control pin extending slidably through said valve shaft for engagement with said coupling sleeve, centrifugal means rotatable by said power shaft and acting on said pin in a direction to decrease said quantity of pump delivery, an abutment on said valve shaft, a lever and movable axially with said valve shaft, a lever carrying a limit control cam and acting against said abutment in one direction, adjustable spring means tending to actuate said last mentioned lever, centrifugal means rotatable by said power shaft and acting on said valve shaft in opposition to said last mentioned lever, a stop collar axially slidable on and adapted to limit the movement of said valve, and a lever operable by said cam to control the position of said collar.

14. A pump mechanism comprising, in combination, a pump having a rotary metering valve axially adjustable to vary the quantity of pump delivery, a plurality of parallel reciprocatory pump units annularly arranged about said valve, spring means tending to urge said valve in a direction to increase said quantity, and drive means for operating said units in timed sequence and including a drive shaft extending axially of said valve, a coupling sleeve having an axially separable driving connection with said valve and constituting a stop for limiting adjustment of said valve under the influence of said spring means, a longitudinally adjustable valve shaft extending axially through said drive shaft and having a slidable straight spline rotary drive connection with said coupling sleeve, a slidable helical spline rotary drive connection between said shafts, a spring-loaded mechanism acting against said sleeve in a direction to increase said quantity of pump delivery, a control pin extending slidably through said valve shaft for engagement with said coupling sleeve, centrifugal means rotatable with said drive shaft and acting on said pin in a direction to decrease said quantity of pump delivery, an abutment on and movable axially with said valve shaft, a spring-loaded mechanism acting against said abutment in a direction to retard the phase relation of said valve shaft to said drive shaft through the action of said helical spline connection, and centrifugal means rotatable with said drive shaft and acting on said valve shaft in opposition to said last mentioned spring-loaded mechanism.

15. A pump mechanism comprising, in combination, a pump having a drive element and having a control element adjustable to vary the quantity of pump delivery, means for automatically adjusting said control element to vary the phase relation of the time of pump delivery to the position of said drive element in response to the operating speed of said pump, and means adjustable in synchronism with said last mentioned means and operable to limit the adjustment of said control element for maximum delivery.

16. A pump mechanism comprising, in combination, a pump having a rotary control element axially adjustable to vary the quantity of pump delivery, an axially adjustable drive shaft having an axially adjustable rotary drive connection with said element, a stop for limiting adjustment of said element in one direction, spring actuated means tending to move said shaft in one axial direction, centrifugal means rotatable in synchronism with said shaft and tending to move said shaft in the other direction, and means controlled by said spring actuated means for determining the position of said stop in response to the operating speed of said pump.

17. A pump mechanism comprising, in combination, a pump having a rotary control element axially adjustable to vary the quantity of pump delivery, a drive shaft having an axially adjustable rotary drive connection with said element, a stop for limiting adjustment of said element in one direction, a lever acting against said shaft in one axial direction and carrying a limit control cam, spring means for actuating said lever, centrifugal means responsive to the rotative speed of said shaft acting in opposition to said lever, and a lever coacting with said cam to control the position of said stop in response to the operating speed of said pump.

18. A pump mechanism comprising, in combination, a pump having a control element adjustable to vary the quantity of delivery, means including an actuating member for adjusting said element, a pneumatic governor for controlling the position of said member, and means adjustable in response to changes in speed of said pump for limiting movement of said member in one direction.

19. A pump mechanism comprising, in combination, a pump having a control element adjustable to vary the quantity of delivery, means including an actuating member for adjusting said element, a cam for adjusting said member, a pneumatic governor for controlling said cam, and a second cam automatically adjustable in response to the operating speed of said pump for limiting the maximum permissible extent of adjustment of said member in accordance with said speed.

20. A pump mechanism comprising, in combination, a pump having a control element adjustable to vary the quantity of delivery, a cam for limiting the adjustment of said element in one direction, a second cam for controlling the adjustment of said element within said limit, and means for operating said second cam.

21. A pump mechanism comprising, in combination, a pump having a control element adjustable to vary the quantity of delivery, governor means for adjusting said element, and means automatically operable in response to the operating speed of said pump for modifying the adjustment of said element independently of said governor means and in accordance with said speed.

22. A pump mechanism comprising, in combination, a pump having a control element adjustable to vary the quantity of delivery, a cam mounted for rotation and for swinging movement and controlling the position of adjustment of said element, means for rotating said cam to adjust said element, and means for swinging said cam to adjust said element.

23. A pump mechanism comprising, in combination, a pump having a control element adjustable to vary the quantity of delivery, a cam mounted for rotation and for swinging movement and controlling the position of adjustment of said element, pneumatic governor means for rotating said cam to adjust said element, and pump speed responsive means for swinging said cam to adjust said element in a direction to increase said quantity upon a decrease in said speed.

24. A pump mechanism comprising, in combination, a pump having a rotary control element axially adjustable to vary the quantity of pump delivery, spring means tending to move said element in a direction to increase said quantity, a stop member limiting the position of said element against the action of said spring means, means responsive to the operating speed of said pump for limiting the position of said member to determine the maximum permissible delivery at any speed, means for adjustably limiting the position of said member independently of said first mentioned means, and two separate means for independently actuating said last mentioned means.

25. A pump mechanism comprising, in combination, a pump having a rotary control element axially adjustable to vary the quantity of pump delivery, spring means tending to move said element in a direction to increase said quantity, a stop member limiting the position of said element against the action of said spring means, and a plurality of independent means selectively operable to adjust the position of said stop member.

26. A pump mechanism comprising in combination, a pumping unit having a drive element, means including a first governor responsive to the pump speed for automatically controlling the quantity of pump delivery, means including a second governor responsive to the pump speed independently of said first governor for automatically controlling the phase relation of the time of said delivery to the position of said drive element, and a stop member adjustable by said second governor and disposed in cooperative relation to said first mentioned means to limit the maximum quantity of pump delivery obtainable by control by said first mentioned means at different pump speeds, while permitting independent control of the quantity of pump delivery by said first mentioned means below said maximum quantity.

CARROLL R. ALDEN.